United States Patent
Kasai

(10) Patent No.: US 9,884,276 B2
(45) Date of Patent: Feb. 6, 2018

(54) FILTRATION FILTER OF ELECTRIC DISCHARGE MACHINE

(71) Applicant: FANUC Corporation, Yamanashi (JP)

(72) Inventor: Hirotsugu Kasai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 220 days.

(21) Appl. No.: 14/474,393

(22) Filed: Sep. 2, 2014

(65) Prior Publication Data

US 2015/0060339 A1 Mar. 5, 2015

(30) Foreign Application Priority Data

Aug. 30, 2013 (JP) .................................. 2013-180458

(51) Int. Cl.
| | |
|---|---|
| B01D 35/00 | (2006.01) |
| B01D 35/02 | (2006.01) |
| B23H 1/10 | (2006.01) |
| B23H 7/36 | (2006.01) |
| B01D 35/143 | (2006.01) |
| B01D 35/157 | (2006.01) |

(52) U.S. Cl.
CPC ......... *B01D 35/02* (2013.01); *B01D 35/1435* (2013.01); *B01D 35/1573* (2013.01); *B23H 1/10* (2013.01); *B23H 7/36* (2013.01)

(58) Field of Classification Search
None
See application file for complete search history.

(56) References Cited

U.S. PATENT DOCUMENTS

| | | | | |
|---|---|---|---|---|
| 4,839,488 A | * | 6/1989 | Katoh | ...................... B23H 1/10 210/510.1 |
| 5,143,586 A | * | 9/1992 | Ozaki | ...................... B23H 3/02 204/224 M |
| 5,282,966 A | * | 2/1994 | Walker | ................... B01D 63/02 210/321.8 |
| 5,593,584 A | | 1/1997 | Nurse, Jr. | |
| 2007/0209978 A1 | * | 9/2007 | Mitchell | ............... F25D 17/042 210/94 |
| 2013/0015121 A1 | | 1/2013 | Mees | |

(Continued)

FOREIGN PATENT DOCUMENTS

| | | |
|---|---|---|
| CN | 1290568 A | 4/2001 |
| CN | 101879387 A | 11/2010 |
| CN | 103170688 A | 6/2013 |

(Continued)

OTHER PUBLICATIONS

Decision to Grant a Patent dated Mar. 10, 2015, corresponding to Japanese patent application No. 2013-180458.

(Continued)

*Primary Examiner* — Richard Gurtowski
(74) *Attorney, Agent, or Firm* — Hauptman Ham, LLP

(57) ABSTRACT

A filter outer cylinder container is a hollow container, and a filter medium is mounted in the container. Fluid passage holes, opened in a side surface member of the filter outer cylinder container, are located at or above a fixed height from a bottom portion of the filter outer cylinder container, whereby a machining liquid is stored in the filter outer cylinder container, so that the filter medium can be always submerged in the machining liquid.

17 Claims, 3 Drawing Sheets

(56) References Cited

U.S. PATENT DOCUMENTS

| | | |
|---|---|---|
| 2013/0161242 A1 | 6/2013 | Kasai |
| 2014/0091020 A1 | 4/2014 | Burke et al. |

FOREIGN PATENT DOCUMENTS

| | | |
|---|---|---|
| JP | 60-141433 A | 7/1985 |
| JP | 61-54421 U | 4/1986 |
| JP | H07-60555 A | 3/1995 |
| JP | 8-243314 A | 9/1996 |
| JP | 2000-77749 A | 3/2000 |
| JP | 2005-161279 A | 6/2005 |
| JP | 2007-276021 A | 10/2007 |
| JP | 2011-143371 A | 7/2011 |
| JP | 2013-104588 A | 5/2013 |
| JP | 2013-522013 A | 6/2013 |
| KR | 10-2006-0058211 A | 5/2006 |

OTHER PUBLICATIONS

Extended European Search Report dated Jan. 16, 2015, corresponding to European patent application No. 14182588.5.

Office Action in KR Application No. 10-2014-0112182, dated Oct. 6, 2016.

Office Action in TW Application No. 103129518, dated Sep. 23, 2016.

* cited by examiner

FILTRATION FILTER OF ELECTRIC DISCHARGE MACHINE

RELATED APPLICATIONS

The present application claims priority to Japanese Application Number 2013-180458, filed Aug. 30, 2013, the disclosure of which is hereby incorporated by reference herein in its entirety.

BACKGROUND OF THE INVENTION

1. Field of the Invention

The present invention relates to a machining liquid filtration device in an electric discharge machine such as a wire-cut electric discharge machine, and relates particularly to a filtration filter of the electric discharge machine, which filters sludge in a machining liquid.

2. Description of the Related Art

In an electric discharge machine such as a wire-cut electric discharge machine, in order to remove sludge such as minute metal scraps of an object to be machined having been discharged during machining and existing in a machining liquid, there has been used a filtration filter formed by folding a filter medium, such as synthetic fiber and cellulose, and by packing the filter medium into a cylindrical metal container or a cylindrical resin container. Here, a combination of a filter medium and a filter outer cylinder container outside the filter medium forms is called "filtration filter".

JP 2005-161279 A discloses a filter which has a filter outer cylinder formed of a punching metal and a large number of fluid passage holes formed in a cylindrical outer wall surface of the filter outer cylinder.

JP 2000-77749 A discloses suppression of an increase in the ion concentration of cooling water due to contact with air while keeping the pressure in a tank constant, maintaining a high resistance value of the cooling water, and extending a life of an ion exchanger.

In JP 2007-276021 A, in order to extend a life of an ion-exchange resin, there is disclosed a device which is provided with a filter holding tank for immersing a filter and is characterized in a liquid discharge unit which discharges a liquid from the filter holding tank.

JP 7-60555 A discloses a device which submerges a filter body in a container separate from the filter body to maintain uniformity of progression of filter clogging, and reduces the flow rate per unit area to extend a filter life.

In general, as disclosed in JP 2005-161279 A, the fluid passage holes opened in the filter outer cylinder container are uniformly opened in the entire side surface of the filter outer cylinder container. Thus, a machining liquid passing through a filter medium unevenly flows through the filter medium due to influence of gravity and clogging of the filter medium. Namely, the clogging progresses from a bottom portion of a filter.

Thus, since the clogging of the filter medium nonuniformly progresses, the flow rate per unit area to the filter medium increases. Since the square of the flow rate and a pressure applied to the filter medium are proportional to each other, a filter pressure easily rises, so that the life of the filter medium is shortened.

In JP 2000-77749 A, in order to extend a life of an ion-exchange resin, there is proposed a structure in which a filter outer cylinder container storing a filter medium is submerged in a clean-water tank. In JP 2007-276021 A and JP 7-60555A, in order to extend the life of the ion-exchange resin or the filter, there is proposed a method of immersing the filter outer cylinder container storing a filter medium in a container separate from the clean-water tank.

However, since the separate container is required to be provided in order to submerge the filter outer cylinder container storing the filter medium, an extra installation space for the separate container and cost are required, and thus the method is not preferable.

In JP 7-60555 A requiring the container separate from the filter outer cylinder container, since it takes time from immersion of the machining liquid, having passed through the filter, in the separate container to overflow of the machining liquid to the outside of the separate container, the time is required until the machining liquid begins to be stored in the clean-water tank. Thus, an alarm may occur due to shortage of the machining liquid in the clean-water tank, or a pump in the clean-water tank may run idled, resulting in a failure. When the separate container is used, it is difficult to insert or remove the filter in or from the separate container while the filter is adhered firmly to the container.

SUMMARY OF THE INVENTION

Thus, in view of the above problems in the prior art, an object of the present invention is to provide a filtration filter capable of extending a life of a filter which is used in an electric discharge machine and filters sludge in a machining liquid.

In the filtration filter of the electric discharge machine according to the present invention, the electric discharge machine comprises a machining tank including an electric discharge machining unit configured to perform electric discharge machining of a workpiece through an electrode, a sewage tank configured to collect and store a machining liquid in the machining tank, and the filtration filter, configured to filter out machining chips of the workpiece and of the electrode, produced as a result of electric discharge machining, from the machining liquid in the sewage tank, and configured to supply the filtered machining liquid into a clean-water tank. The filtration filter of the electric discharge machine comprises a filter medium configured to filter the machining liquid and an outer cylinder container configured to store the filter medium and has on its outer circumference fluid passage holes through which the machining liquid is configured to pass, and the fluid passage holes are provided only at an upper portion of the outer cylinder container.

The fluid passage holes may be located on an upper end side relative to a position of a intermediate surface, middle in height, between an upper end surface and a lower end surface of the outer cylinder container.

The outer cylinder container of the filtration filter may have a machining liquid discharge hole through which the machining liquid stored in the outer cylinder container is configured to be discharged outside the outer cylinder container. The machining liquid discharge hole may have any one of a plug, an opening and closing valve, a solenoid valve, and a cylinder valve. The solenoid valve or the cylinder valve may be opened and closed in conjunction with a filter flow volume, a filter flow velocity, or an alarm generated corresponding to a detection signal of a filter flow rate, a filter flow velocity, or a filter pressure.

The filtration filter may further comprising, fluid passage holes distributed over the entire region of the outer cylinder container, in place of the fluid passage holes only at the upper portion of the outer cylinder container, and a cover member configured to cover the fluid passage holes only at a lower portion of the outer cylinder container.

The fluid passage holes not covered by the cover member may be located on the upper end side relative to the position of the intermediate surface between the upper end surface and the lower end surface of the outer cylinder container.

The cover member may have a machining liquid discharge hole through which the machining liquid stored in the cover member is configured to be discharged outside the cover member. The filtration filter may further comprising, any one of a plug, an opening/closing valve, a solenoid valve, or a cylinder valve, over the machining liquid discharge hole. The solenoid valve or the cylinder valve may be opened and closed, in conjunction with a filter flow volume, a filter flow velocity, or an alarm generated corresponding to a detection signal of a filter flow rate, a filter flow velocity, or a filter pressure.

A seal material may be provided between an inner surface of the cover member and an outer surface of the outer cylinder container.

The cover member may be configured to be radially attached to the filtration filter and removed from the filtration filter.

According to the above constitution, the present invention can provide a filtration filter capable of extending a life of a filter which is used in an electric discharge machine and filters sludge in a machining liquid.

The aforementioned and other objects and features of the present invention will be apparent from the following description of embodiments with reference to the accompanying drawings.

DETAILED DESCRIPTION OF THE PREFERRED EMBODIMENTS

Figure 1:
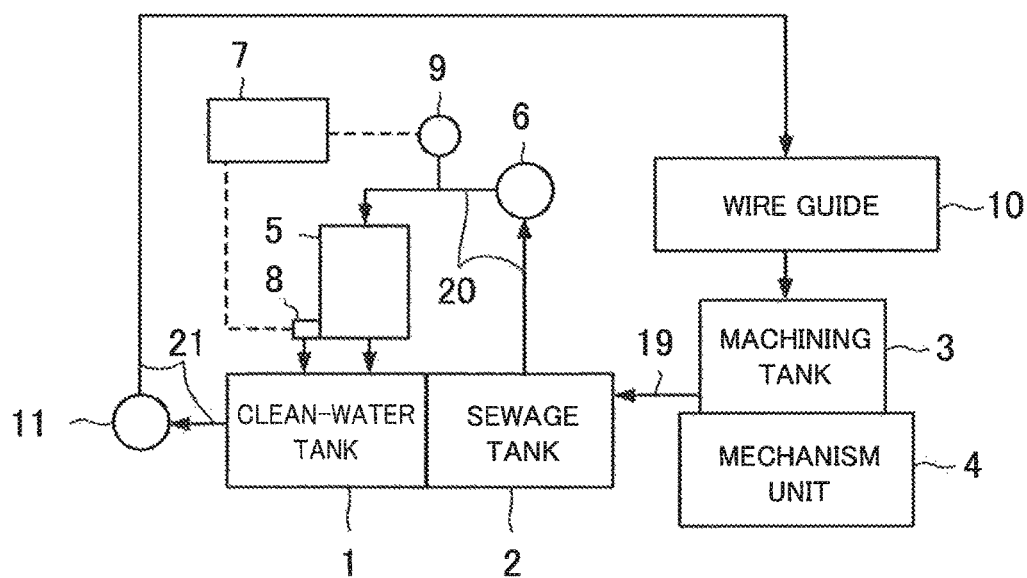
FIG. 1 is a block diagram for explaining a schematic configuration of an electric discharge machine.

FIG. 1 is a block diagram for explaining a schematic configuration of an electric discharge machine. In the present embodiment, a wire electric discharge machine will be described as an example of the electric discharge machine.

In the wire electric discharge machine, a machining tank 3 is provided at a mechanism unit 4. A workpiece to be machined is placed on a table (not shown) of the mechanism unit 4. The table of the mechanism unit 4 is disposed in the machining tank 3. A wire electrode (not shown) is supported by upper and lower wire guides 10. A voltage is applied to between the workpiece and the wire electrode, and the workpiece and the wire electrode are relatively moved while discharging electricity, whereby the workpiece is subjected to electric discharge machining. A controller 7 controls the overall operation of the wire electric discharge machine and applies the electric discharge machining to the workpiece.

A machining liquid supplied from a clean-water tank 1 is stored in the machining tank 3. Machining chips produced by the electric discharge machining, that is, sludge is mixed in the machining liquid in the machining tank 3. The machining liquid in the machining tank 3 flows into a sewage tank 2 through a piping 19 and is collected in the sewage tank 2.

The machining liquid, collected from the machining tank 3 and stored in the sewage tank 2, is pumped up by a filter pump 6 to be passed through a filtration filter 5, and, thus, to be filtered. Thereby, machining chips, that is, sludge is removed, and the filtered machining liquid is supplied into the clean-water tank 1. In a piping 20 connecting the filter pump 6 and the filtration filter 5, a filter pressure gauge 9 measuring a pressure applied to the filter is provided. A signal detected by the filter pressure gauge 9 is input to the controller 7. A machining liquid pump 11 controlled by the controller 7 pumps up the machining liquid from the clean-water tank 1 and supplies the filtered machining liquid to a wire guide 10 and so on through a piping 21. A machining liquid discharge hole 8 is provided for discharging the machining liquid, stored in the filtration filter 5, from the filtration filter 5.

Next, the filtration filter 5 used in the electric discharge machine as described above will be described.

Figure 2:
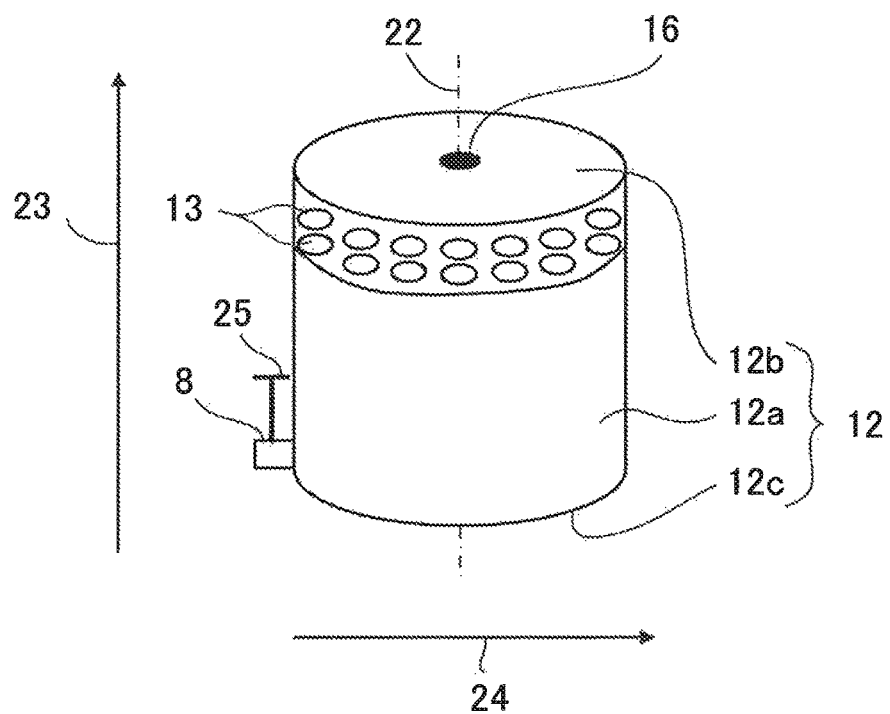
FIG. 2 is a view for explaining an embodiment in which fluid passage holes are opened only at an upper portion.

FIG. 2 explains an embodiment in which fluid passage holes are opened only at an upper portion. The filtration filter 5 has a configuration in which a filter medium is supported from outside by a filter outer cylinder container. A filter outer cylinder container 12 includes a cylindrical side surface member 12a, an upper lid member 12b, and a lower lid member 12c, and is a hollow container inside. As the filter medium, a conventionally used one such as filter paper may be used. The side surface member 12a has on its bottom portion the machining liquid discharge hole 8 through which the machining liquid stored in the filtration filter 5 is discharged.

The upper lid member 12b is connected to the piping 20 through which the machining liquid pumped up by the filter pump 6 is transported, and has a filter coupler mounting portion 16 through which the machining liquid is supplied into the filtration filter 5. In the machining liquid supplied into the filtration filter 5 from the filter pump 6, machining chips contained in the machining liquid, that is, sludge is caught by the filter medium. The machining liquid, from which the machining chips are removed, is discharged outside the filtration filter 5 through fluid passage holes 13. The machining liquid discharged from the filtration filter 5 is collected in the clean-water tank 1.

In the embodiment of the filtration filter 5 shown in FIG. 2, the fluid passage holes 13 opened in the side surface member 12a of the filter outer cylinder container 12 may be located at or above a fixed height from a bottom portion of the filter outer cylinder container 12, and the fluid passage hole 13 is not provided below the fixed height. Here, the "upper portion" described in claim 1 includes a portion from the bottom portion of the filter outer cylinder container 12 to a portion located at or above a predetermined height. According to this constitution, the machining liquid can be stored in the filter outer cylinder container 12, and the filter medium can be always submerged in the machining liquid. As an example in which the fluid passage holes 13 are provided at or above a fixed height, a plurality of the fluid passage holes 13 may be provided on the upper side relative to a position of an intermediate surface, which is middle in height, between an upper end surface and a lower end surface of the filter outer cylinder container 12.

In the filtration filter 5 having the configuration of the present embodiment, since the filter medium is always submerged in the machining liquid in the filter outer cylinder container 12, each life of an ion-exchange resin and a filter, such as a filter medium, can be extended without requiring troublesome work for immersing the filtration filter 5 in the clean-water tank or a container separate from the clean-water tank.

In place of eliminating some of the fluid passage holes 13 opened in the filter outer cylinder container 12, the lower fluid passage holes 13 of the fluid passage holes 13 provided in the filter outer cylinder container 12 may be closed using a cover member 14 covering the filter outer cylinder container 12, whereby the filter medium may be always submerged in the machining liquid.

Figure 3:
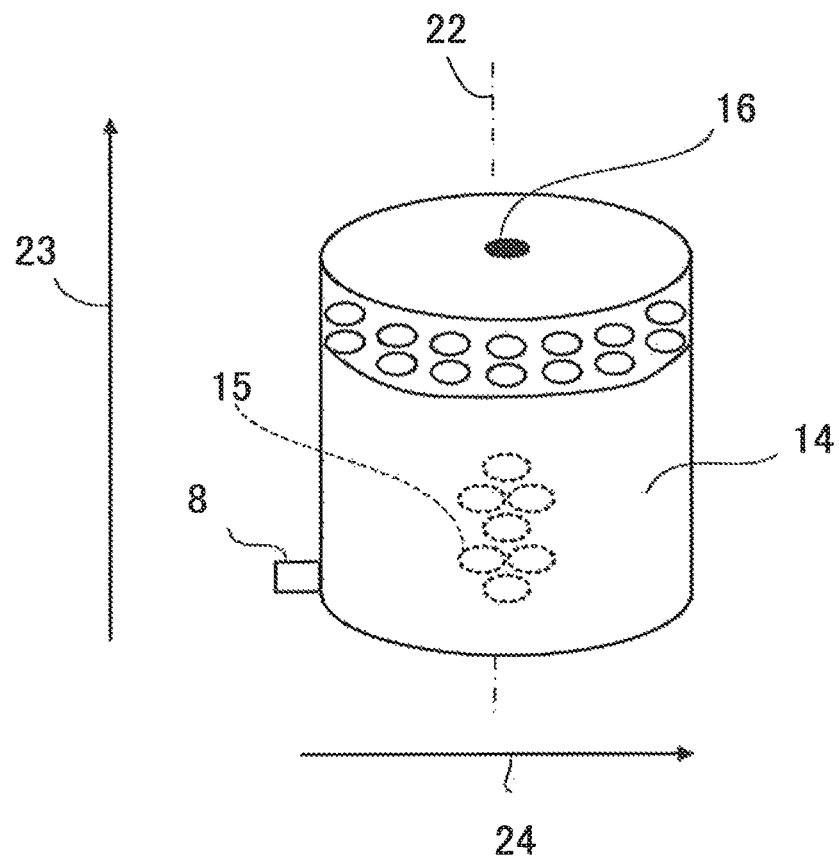
FIG. 3 is a view for explaining an embodiment in which a lower portion of a filtration filter is covered by a cover member.

As a specific configuration of above mentioned, as shown in FIG. 3, in the filtration filter 5 having the fluid passage holes 13 distributed over the entire side surface of the filter outer cylinder container 12, there is used a member for directly covering fluid passage holes 15, other than the fluid passage holes 13 provided in a predetermined upper region of the filter outer cylinder container 12, with a sheet metal, a resin plate, a waterproof tape, or the like as the cover member 14. Since the lower fluid passage holes 13 are covered by the cover member 14, the filter medium is always submerged in the machining liquid in the cover member 14. According to this constitution, each life of the ion-exchange resin and the filter medium can be extended without immersing the filtration filter 5 in the clean-water tank 1 or a container separate from the clean-water tank 1.

When the filter outer cylinder container 12 is covered by a sheet metal, a resin plate, or the like as the cover member 14 while the cover member 14 is adhered firmly to the filter outer cylinder container 12, a gap between the filter outer cylinder container 12 and the cover member 14, such as a sheet metal and a resin plate, covering the filter outer cylinder container 12 is eliminated. According to this constitution, a volume required to submerge the machining liquid is reduced. For this reason, the time until the machining liquid overflows from the cover member 14 is reduced.

The time required until the machining liquid having passed through the filtration filter 5 begins to be stored in the clean-water tank 1 is reduced, whereby especially when combined with the method, as disclosed in JP 2005-46984 A, for obtaining a discharge flow rate of the filter pump 6 according to a height difference between a liquid level position of the clean-water tank 1 and a reference position, water can be stored in the clean-water tank 1, or namely, a purified machining liquid can be stored, with high response. It is also effective to combine the present invention with any flow rate control of the filter pump 6, such as a method of keeping the discharge flow rate of the filter pump 6 constant with the use of a constant flow rate valve and so on and a method of changing the discharge flow rate of the filter pump 6 according to machining conditions.

Figure 4:
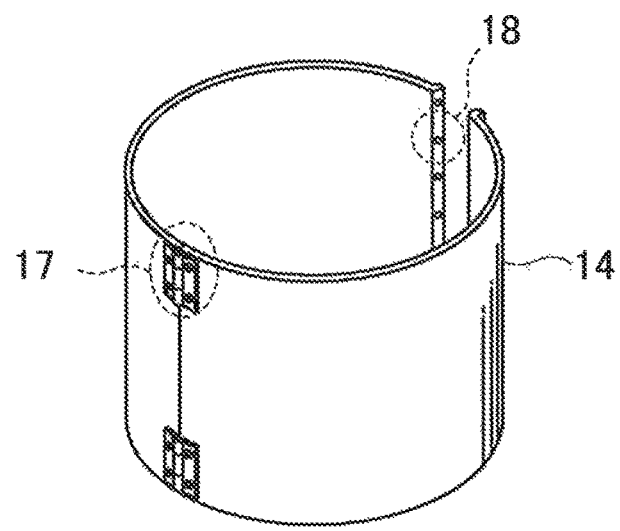
FIG. 4 is a view for explaining an example in which the cover member includes an openable sheet metal.

As shown in FIG. 4, a cylindrical sheet metal or a resin plate as the cover member 14 covering the filter outer cylinder container 12 is provided by dividing two or more portions in parallel with an axis line 22 of the cylindrical filtration filter 5 and is of an openable type, like a double door, with hinges 17. When the filter outer cylinder container 12 is covered, a portion with no hinge is fixed by using screws, bolts, latches, hooks, bands, or the like. Reference numeral 18 is a fastening tape.

When the cover member 14 is of the openable type, the cylindrical sheet metal or the resin plate covering the filter outer cylinder container 12 can be attached or detached while the filtration filter 5 is installed. Consequently, it is possible to eliminate the difficulty in the prior art that the filtration filter 5 is lifted up when inserted in or removed from a separate container.

Figure 5:
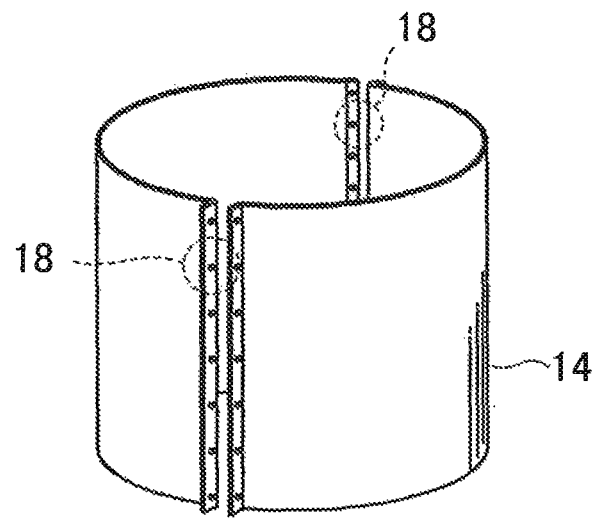
FIG. 5 is a view for explaining an example in which the cover member includes a dividable sheet metal.

As shown in FIG. 5, the cover member may be of a dividable type using screws, bolts, latches, hooks, bands, or the like instead of the hinges 17. Regarding the division direction, the cover member may be divided by a dividing line parallel to the axis line 22 of the cylindrical filtration filter 5 or may be divided obliquely to the axis line 22 of the cylindrical filtration filter 5. The dividing line may be a straight line or may have any shape other than a straight line, such as a curved shape, a step shape, and a concavoconvex shape.

The dividable type herein denotes that in the fastening of the cylindrical sheet metal or the resin plate as the cover member 14 covering the filter outer cylinder container 12, both ends of the cover member 14 are fastened by using a bolt instead of using the hinges 17. In the division, a fastening method using screws, latches, hooks, bands, or the like instead of bolts may be used, or plural fastening methods may be selected or may be combined with each other.

In a lower portion in the axis line 22 of the cylindrical filtration filter 5, in order to prevent water and the machining liquid from leaking through a gap between the filter outer cylinder container 12 and the cylindrical sheet metal or the resin plate as the cover member 14 covering the filter outer cylinder container 12, a seal material such as an EPT sealer may be applied inside the cylindrical sheet metal or the resin plate as the cover member 14 covering the filter outer cylinder container 12. Alternatively, the seal material may be applied outside the filter outer cylinder container 12. Namely, the seal material may be interposed in a gap between the filter outer cylinder container 12 and the cover member 14.

The filter medium in the machining liquid can be submerged by both the unit for eliminating some of the fluid passage holes 13 opened in the filter outer cylinder container 12 and the unit for directly covering the fluid passage holes 15, other than the upper fluid passage holes 13 of the filter outer cylinder container 12, with a sheet metal, a resin plate, a waterproof tape, or the like as the cover member 14.

As described above, in the present embodiment, the filter medium in the filtration filter 5 can be always submerged in the machining liquid. However, due to the life of the filter medium, the filter pressure reaches an pressure requiring a filter medium exchange, and when the filter medium is exchanged, the weight is large in such a state that the inside of the filter remains submerged in the machining liquid, so that a troublesome work is required for an exchange operation.

An opening/closing valve 25 for drainage is attached to the main body of the filter outer cylinder container 12 or the sheet metal or the resin plate as the cover member 14 covering the filtration filter 5, and the machining liquid in the filter is discharged when the filter is exchanged. As shown in FIG. 2, the opening/closing valve 25 for drainage is provided at the machining liquid discharge hole 8. The machining liquid stored in the filtration filter 5 can be discharged from the filtration filter 5 by opening/closing the opening/closing valve 25.

A small diameter hole may be opened instead of the opening/closing valve. Regarding the size of the hole, the flow rate of the machining liquid passed through the small diameter hole by its own weight and so on needs to be smaller than the flow rate flowing through the filter. It is also allowed that the hole for drainage is subjected to tapping and plugged, the plug is removed only when the filter is exchanged, and the machining liquid in the filter is drained.

A solenoid valve or a cylinder valve may be attached instead of the opening/closing valve 25 to drain the machining liquid. Alternatively, the solenoid valve or the cylinder valve may be opened/closed in conjunction with the filter pressure, and the valve may be automatically opened when the filter pressure increases to reach the pressure requiring a filter medium exchange or when a filter pressure alarm occurs, whereby the machining liquid in the filter is be drained automatically. When the filter flow rate is kept constant using a constant flow rate valve or an inverter, the filter flow rate and the filter flow velocity are lowered if the filter pressure increases. Thus, the solenoid valve or the cylinder valve may be opened/closed in conjunction with the filter flow rate and the filter flow velocity instead of the filter pressure. At this time, when the filter flow rate and the filter flow velocity are lowered to be less than a predetermined flow rate and a predetermined flow velocity, the valve may be automatically opened after the filter pump is stopped after the filter pressure is determined to be increased, and the machining liquid in the filter may be drained automatically.

When the filter pressure reaches the pressure requiring a filter medium exchange or when the filter pressure alarm occurs, the clean-water tank 1 may simultaneously become short of the machining liquid, and therefore, the solenoid valve or the cylinder valve may be opened/closed in conjunction with a clean-water tank water shortage alarm. Note that the controller 7 may control the drainage of the machining liquid.

In the filtration filter 5 which is of a type in which the filter outer cylinder container 12 is covered by the cover member 14, the filter outer cylinder container 12 has a hole for draining the machining liquid, and, at the same time, the cover member 14 has a machining liquid discharge hole communicating with the hole of the filter outer cylinder container 12.

Figure 6:
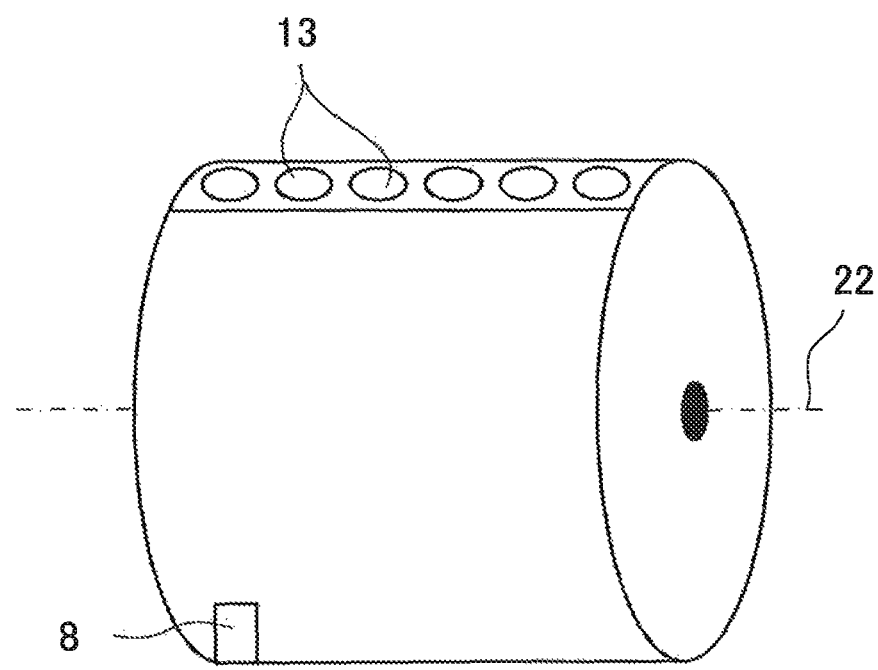
FIG. 6 is a view for explaining an embodiment of the filtration filter installed so that the axis line extends horizontally.

Although the above embodiment is based on the assumption that the cylindrical filtration filter 5 is installed so that the axis line of the filtration filter 5 extends vertically, the present invention can be applied to the case where a cylindrical filtration filter is installed so that the axis line of the filtration filter extends horizontally. For example, as shown in FIG. 6, when the cylindrical filtration filter 5 is installed so that the axis line of the filtration filter 5 extends horizontally, some lines of a punching metal of an upper surface of the filter outer cylinder container 12, that is, a side surface of the filter outer cylinder container 12 in the case where the cylindrical filtration filter 5 is installed so that the axis line extends vertically are left, and other lines may be eliminated. Alternatively, a portion other than the upper surface of the filter outer cylinder container 12 may be covered by a sheet metal, a resin plate, or the like. An "upper portion" described in claim 1 includes, among the upper surface of the filter outer cylinder container 12 in the present embodiment, a portion including only a predetermined number of lines of a punching metal. A "lower portion" described in claim 6 includes, in the filter outer cylinder container 12, a portion other than the upper portion including only the predetermined number of lines of the punching metal, that is, a portion, in the filter outer cylinder container 12, below a predetermined height from an installed surface of the filtration filter.

When the prior art is used, as an insertion/removal direction in which the filter is inserted in or removed from a separate container, the filter can be inserted or removed only in an axis line direction 23 of the filter. However, in the present embodiment, the filter can be inserted or removed in a direction vertical to the axis line of the filter, that is, a radial direction 24 of the filter. Thus, since the filter is not required to be lifted up in the axis line direction 23 of the filter, the filter is easily inserted or removed when exchanged.

Note that "the fluid passage holes are provided only at an upper portion of the outer cylinder container" in claim 1 and "a cover member configured to cover the fluid passage holes only at a lower portion of the outer cylinder container" in claim 6 include the embodiment shown in FIG. 6.

The invention claimed is:

1. A filtration filter of an electric discharge machine, the electric discharge machine configured to:
    collect and store a machining liquid in a sewage tank from a machining tank having therein an electric discharge machining unit configured to perform electric discharge machining of a workpiece through an electrode;
    allow the filtration filter to filter out machining chips of the workpiece and of the electrode, said chips produced as a result of electric discharge machining, from the machining liquid collected and stored in the sewage tank; and
    supply the filtered machining liquid into a clean-water tank,
the filtration filter comprising:
    a filter medium configured to filter the machining liquid; and
    an outer cylinder container containing the filter medium, and having, on an outer circumference of the outer cylinder container, fluid passage holes through which the filtered machining liquid-is passable, wherein
    the fluid passage holes are provided only in an upper portion of the outer cylinder container,
wherein the outer cylinder container of the filtration filter has a machining liquid discharge hole through which the machining liquid stored in the outer cylinder container is dischargeable to an outside of the outer cylinder container, and
wherein the machining liquid discharge hole comprises a valve, and the valve is configured to be opened and closed in conjunction with
    a filter flow volume of the filtration filter, wherein the valve is configured to open in response to the filter flow volume being less than a predetermined flow volume after a filter pressure of the filtration filter is increased to reach a predetermined pressure, so as to drain the machining liquid stored in the outer cylinder container,
    a filter flow velocity of the filtration filter, wherein the valve is configured to open in response to the filter flow velocity being less than a predetermined flow velocity after the filter pressure of the filtration filter is increased to reach the predetermined pressure, so as to drain the machining liquid stored in the outer cylinder container, or
    an alarm generated corresponding to a detection signal of
        the filter flow volume of the filtration filter,
        the filter flow velocity of the filtration filter, or
        the filter pressure of the filtration filter.

2. The filtration filter according to claim 1, wherein the fluid passage holes are located above a midpoint in height between an upper end surface and a lower end surface of the outer cylinder container, and the machining liquid discharge hole is located in a lower portion of the outer cylinder container, below all of said fluid passage holes.

3. The filtration filter according to claim 1, wherein the valve comprises a solenoid valve, or a cylinder valve.

4. A filtration filter of an electric discharge machine, the electric discharge machine configured to:
   collect and store a machining liquid in a sewage tank from a machining tank having therein an electric discharge machining unit configured to perform electric discharge machining of a workpiece through an electrode;
   allow the filtration filter to filter out machining chips of the workpiece and of the electrode, said chips produced as a result of electric discharge machining, from the machining liquid collected and stored in the sewage tank; and
   supply the filtered machining liquid into a clean-water tank,
   the filtration filter comprising:
      a filter medium configured to filter the machining liquid; and
      an outer cylinder container containing the filter medium;
      fluid passage holes through which the filtered machining liquid is passable, the fluid passage holes being distributed over an entire region of the outer cylinder container; and
      a cover member configured to cover the fluid passage holes only in a lower portion of the outer cylinder container,
   wherein the cover member has a machining liquid discharge hole through which the machining liquid stored in the outer cylinder container is dischargeable to an outside of the cover member, and
   wherein the machining liquid discharge hole comprises a valve, and the valve is configured to be opened and closed in conjunction with
      a filter flow volume of the filtration filter, wherein the valve is configured to open in response to the filter flow volume being less than a predetermined flow volume after a filter pressure of the filtration filter is increased to reach a predetermined pressure, so as to drain the machining liquid stored in the outer cylinder container,
      a filter flow velocity of the filtration filter, wherein the valve is configured to open in response to the filter flow velocity being less than a predetermined flow velocity after the filter pressure of the filtration filter is increased to reach the predetermined pressure, so as to drain the machining liquid stored in the outer cylinder container, or
      an alarm generated corresponding to a detection signal of
         the filter flow volume of the filtration filter,
         the filter flow velocity of the filtration filter, or
         the filter pressure of the filtration filter.

5. The filtration filter according to claim 4, wherein
   the fluid passage holes not covered by the cover member are located above a midpoint in height between an upper end surface and a lower end surface of the outer cylinder container, and
   the machining liquid discharge hole is located in the lower portion of the outer cylinder container, below all of the fluid passage holes not covered by the cover member.

6. The filtration filter according to claim 4, wherein the valve comprises a solenoid valve, or a cylinder valve.

7. The filtration filter according to claim 4, further comprising:
   a seal material provided between an inner surface of the cover member and an outer surface of the outer cylinder container.

8. The filtration filter according to claim 4, wherein the cover member is configured to be radially attached to the outer cylinder container and detachable from the-outer cylinder container.

9. The filtration filter according to claim 4, wherein the cover member comprises a cylindrical sheet divided into two portions in parallel with an axis line of the outer cylinder container.

10. The filtration filter according to claim 4, wherein the cover member comprises any one of a sheet metal, a resin plate, and a waterproof tape.

11. The filtration filter according to claim 4, further comprising:
   hinges that attach the cover member to the outer cylinder container.

12. The filtration filter according to claim 1, wherein
   the machining liquid collected from the machining tank is pumped up by a filter pump to pass through the filtration filter, and
   the valve is configured to be opened so as to automatically drain the machining liquid stored in the outer cylinder container
      in response to the filter flow volume being less than the predetermined flow volume, and
      after the filter pump is stopped after the filter pressure of the filtration filter is increased to reach the predetermined pressure.

13. The filtration filter according to claim 1, wherein
   the machining liquid collected from the machining tank is pumped up by a filter pump to pass through the filtration filter, and
   the valve is configured to be opened so as to automatically drain the machining liquid stored in the outer cylinder container
      in response to the filter flow velocity being less than the predetermined flow velocity, and
      after the filter pump is stopped after the filter pressure of the filtration filter is increased to reach the predetermined pressure.

14. The filtration filter according to claim 1, wherein the predetermined pressure is a pressure requiring exchange of the filter medium.

15. The filtration filter according to claim 4, wherein
   the machining liquid collected from the machining tank is pumped up by a filter pump to pass through the filtration filter, and
   the valve is configured to be opened so as to automatically drain the machining liquid stored in the outer cylinder container
      in response to the filter flow volume being less than the predetermined flow volume, and
      after the filter pump is stopped after the filter pressure of the filtration filter is increased to reach the predetermined pressure.

16. The filtration filter according to claim 4, wherein
   the machining liquid collected from the machining tank is pumped up by a filter pump to pass through the filtration filter, and the valve is configured to be opened so as to automatically drain the machining liquid stored in the outer cylinder container
in response to the filter flow velocity being less than the predetermined flow velocity, and
after the filter pump is stopped after the filter pressure of the filtration filter is increased to reach the predetermined pressure.

17. The filtration filter according to claim 4, wherein the predetermined pressure is a pressure requiring exchange of the filter medium.

* * * * *